United States Patent
Ota et al.

[15] 3,699,948
[45] Oct. 24, 1972

[54] RECORDING DEVICE WITH AUTOMATIC GAIN RANGE CHANGER AND D.C. CORRECTION MEANS

[72] Inventors: Tomiyoshi Ota; Katunobu Takigawa; Masasada Honda, all of Tokyo, Japan

[73] Assignee: Nihon Denshi Kabushiki Kaisha, Tokyo, Japan

[22] Filed: May 14, 1971

[21] Appl. No.: 143,552

[30] Foreign Application Priority Data

May 16, 1970    Japan ...................... 45/41741

[52] U.S. Cl. .......... 128/2.06 G, 128/2.06 B, 307/264, 330/29, 330/149

[51] Int. Cl. ............................................. A61b 5/04

[58] Field of Search ........ 128/2.06 B, 2.06 G, 2.06 R, 128/2.05 Q; 330/29, 149; 307/264

[56] References Cited
UNITED STATES PATENTS

| | | |
|---|---|---|
| 3,451,006 | 6/1969 | Grangaard, Jr. .......128/2.06 B |
| 3,480,871 | 11/1969 | Rogers et al. ................. 330/29 |
| 3,500,316 | 3/1970 | Brown ......................... 330/29 |
| 3,510,682 | 5/1970 | Nichols ........................ 330/29 |
| 3,580,243 | 5/1971 | Johnson ................ 128/2.06 B |
| 3,590,811 | 7/1971 | Harris ................... 128/2.06 R |

Primary Examiner—William E. Kamm
Attorney—Webb, Burden, Robinson & Webb

[57] ABSTRACT

An automatic recording device incorporating a range changer and an asymmetrical DC level correcting means. The range changer automatically selects a gain capable of supplying the recorder, for example, with an electrocardiograph signal of suitable amplitude regardless of the amplitude of the detected electrocardiograph signal. The asymmetrical DC level correcting means corrects the DC level of the recorder so as to center the electrocardiogram on the recording chart.

5 Claims, 3 Drawing Figures

PATENTED OCT 24 1972  3,699,948

Tomiyoshi Ota
Katunobu Takigawa
Masasada Honda
by Webb, Bearden, Robenson & Webb
their attorneys

3,699,948

RECORDING DEVICE WITH AUTOMATIC GAIN RANGE CHANGER AND D.C. CORRECTION MEANS

BACKGROUND OF THE INVENTION

This invention relates to a recording device capable of recording an electrocardiogram of more or less uniform amplitude regardless of the amplitude of the input signal.

The amplitude of an electrocardiograph signal differs with each person being tested and with which part of the body the bioelectrode is attached. Also, the upper and lower sides of the signal are asymmetrical. Hence, in prior art devices it is necessary for the person operating the devices to manually adjust the amplitude and recording position of the electrocardiograph signal in order to record an electrocardiogram having an appropriate amplitude and location. Clearly, a certain amount of skill is required to record a good electrocardiogram.

SUMMARY OF THE INVENTION

Briefly, a device according to this invention detects the positive peak signal and the negative peak signal of the electrocardiograph signal wave form emanating from the person under examination. It then detects a peak-peak signal and an asymmetrical DC signal from said positive and negative peak signals. The gain range of an incorporated range changer is automatically selected according to said peak-peak signal so as to always record an electrocardiogram of more or less constant amplitude. The superimposed signals; i.e., the signal passed through the range changer and the asymmetrical DC signal, are then fed into a recorder and recorded.

It is an advantage of this invention to provide a recording device which operates automatically, which always records an electrocardiogram or similar signal pattern at a suitable amplitude and which always records the electrocardiogram so that the portions of the electrocardiogram above and below the center line are more or less equal.

BRIEF DESCRIPTION OF THE DRAWING

The invention will be readily understood by reading the following detailed description made with reference to the attached drawing in which.

DESCRIPTION OF THE PREFERRED EMBODIMENT

Referring now to the figures, a bioelectrode 1 attached to the person being examined detects an electrocardiograph signal which is amplified by a preamplifier 2.

Figure 2:
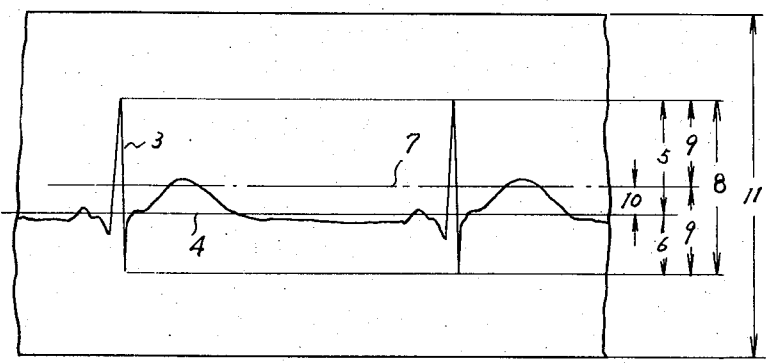
FIG. 2 is an electrocardiogram used for explanatory purposes.

Referring to the electrocardiogram shown in FIG. 2, signal wave form 3 is recorded. A straight line 4 is the mean position of the recorded signal. Maximum positive 5 and negative 6 signal peak are indicated. Broken line 7 indicates the median position of the two maximum positive and negative peaks. The peak-peak height 8 of the electrocardiogram and the half peak-peak height 9 are shown. The difference 10 between the mean and median positions; i.e., the amount by which the DC level requires correcting and the width of the recording paper 11 are also shown.

The preamplified signal is detected by two peak detectors 12 and 13. More specifically, positive peak detector 12 detects the maximum positive peak value of the signal and negative peak detector 13 detects the maximum negative peak value of said signal. The detected outputs of the two detectors are then fed into a differential amplifier 14 which differentiates both peak values to obtain the peak-peak value. Next, the differentiated output of the differential amplifier 14 is applied to two comparators 15 and 16 each having standard voltage levels. For the sake of explanation, we will refer to these two standard voltage levels as A and B. Now supposing, for example, that A is less than B, the output of both comparators will be "0" if the differentiated output from the differential amplifier 14 is less than A. Further, if the differentiated output is greater than A but less than B, the output of comparator 15 will be "1" and the output of comparator 16 will be "0." Lastly, if the differentiated output is greater than B, the outputs of comparators 15 and 16 will be "1." The outputs of comparators are determined by the output of the differential amplifier 14 or, in other words, the peak-peak value of the electrocardiograph signal.

Figure 1:
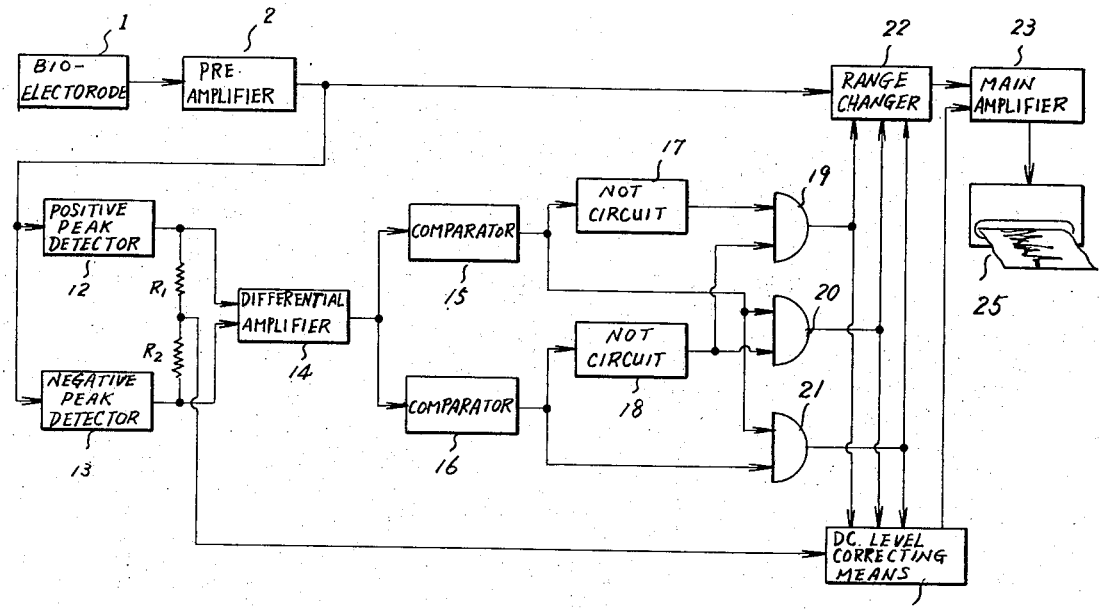
FIG. 1 is a block diagram showing one embodiment of this invention.

As shown in FIG. 1, by connecting comparator 15 to AND circuit 19 via NOT circuit 17 and to AND circuits 20 and 21 directly and by connecting comparator 16 to AND circuits 19 and 20 via NOT circuit 18 and to AND circuit 21 directly, the AND circuits operate selectively in accordance with the value of the aforementioned peak-peak signal.

If the peak-peak value is less than A, AND circuit 19 detects "1" and AND circuits 20 and 21 detect "0." If the peak-peak value is greater than A but less than B, AND circuit 20 detects "1" and AND circuits 19 and 21 detect "0." If the peak-peak value is greater than B, AND circuit 21 detects "1" and AND circuits 19 and 20 detect "0."

Each AND circuit is connected to one of three gate circuits constituting range changer 22, said range changer operating to change the gain range by selectively closing one of the gate circuits in accordance with the aforementioned operative sequence. In this way, an electrocardiograph signal of suitable amplitude is fed to main amplifier 23.

Additionally, the junction of resistors $R_1$ and $R_2$, connected in series between the outputs of detectors 12 and 13, is connected to DC level correcting means 24 also consisting of three gate circuits which operate in accord with the range changer gate circuits. In other words, the asymmetrical DC voltage from the junction of resistors $R_1$ and $R_2$ is divided in proportion to the gain range change of the range changer. As a result, an asymmetrical DC voltage between the maximum positive value of the signal and the maximum negative value of the signal is applied to main amplifier 23 after being reduced to a suitable level by the DC level correcting means 24.

In the main amplifier 23, the DC voltage from the DC level correcting means and electrocardiograph signal from the range changer are superimposed so that the center of the electrocardiogram corresponds with the center of the recording paper of recorder 25 upon which the electrocardiograph signal is recorded.

Figure 3:
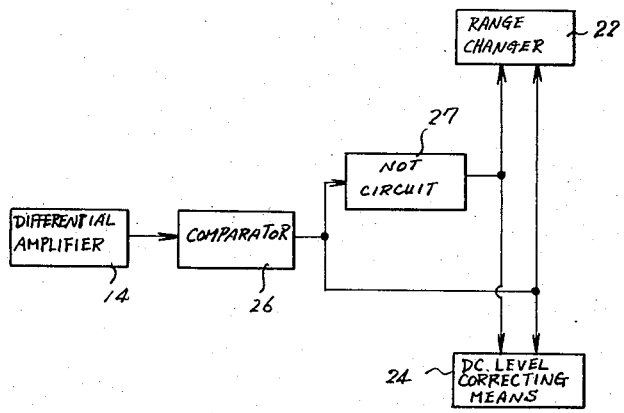
FIG. 3 is a block diagram showing part of another embodiment of this invention.

Further, it is also possible to construct the circuit comprising differential amplifier 14, comparator 15, NOT circuit 27 as shown in FIG. 3. In this case, the differentiated output of the differential amplifier 14 is applied to a comparator 26 having a standard voltage level C. The output of the comparator 26 is "0" if the differentiated output from said differential amplifier is less than C. If said output is greater than C, the output of said comparator is "1." The output of the comparator 26 is split, one part being fed to 22 and 24 directly, the other part being fed to said circuits via NOT circuit 27.

In cases where the wave form to be recorded is not unduly asymmetrical or there is sufficient chart paper clearance above and below the electrocardiogram, the asymmetrical DC voltage may be applied directly to the main amplifier 23 without passing it through the DC level correcting means 24.

Having thus described the invention with the detail and particularity as required by the Patent Laws, what is desired protected by Letters Patent is set forth in the following claims.

1. A recording device comprising a bioelectrode for detecting an electrocardiograph signal, means for detecting a peak-peak value of said electrocardiograph signal, means for changing the range in which gain is automatically selected in accordance with said peak-peak value so as to obtain an electrocardiograph signal of suitable amplitude regardless of amplitude of detected electrocardiograph signal, means for detecting an asymmetrical DC signal of said electrocardiograph signal in order to record an electrocardiogram at the center of the recording paper and a recorder for recording said electrocardiograph signal passed through said range changer after superimposing said asymmetrical DC signal.

2. A recording device as claimed in claim 1 comprising at least one comparator having a standard voltage level, said comparator operating said range changer by means of the signal obtained by comparing said peak-peak value with said standard voltage level.

3. A recording device comprising a bioelectrode for detecting an electrocardiograph signal, means for detecting the positive peak value and the negative peak value of said electrocardiograph signal, means for obtaining a peak-peak value from said positive peak value and said negative peak value, means for changing the range in which gain is automatically selected in accordance with said peak-peak value so as to obtain an electrocardiograph signal of suitable amplitude regardless of amplitude of detected electrocardiograph signal, means for detecting an asymmetrical DC signal of said electrocardiograph signal from said positive peak value and said negative peak value and a recorder for recording said electrocardiograph signal passing through said range changer after superimposing said asymmetrical DC signal.

4. A recording device as claimed in claim 3 wherein said means for detecting asymmetrical DC signal comprises two series resistors connected between the outputs of said positive and negative peak value detecting means and an asymmetrical DC level correcting means for correcting the level of said asymmetrical DC signal detected at the junction of said two resistors.

5. A recording device as claimed in claim 4 wherein said DC level correcting means corrects the level of said asymmetrical DC signal in unison with said range changer.

* * * * *